United States Patent
Jeong et al.

(10) Patent No.: US 8,002,615 B2
(45) Date of Patent: Aug. 23, 2011

(54) BLOWER FOR VEHICLE

(75) Inventors: Chunshik Jeong, Daejeon-si (KR); Daewoong Lee, Daejeon-si (KR); Minsoo Kim, Daejeon-si (KR); Jongsu Kim, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 411 days.

(21) Appl. No.: 11/784,812

(22) Filed: Apr. 10, 2007

(65) Prior Publication Data

US 2007/0238406 A1    Oct. 11, 2007

(30) Foreign Application Priority Data

Apr. 11, 2006 (KR) .................. 10-2006-0032836
Sep. 12, 2006 (KR) .................. 10-2006-0088036
Jan. 12, 2007 (KR) .................. 10-2007-0003673

(51) Int. Cl.
*B60H 1/00* (2006.01)
*B60H 1/26* (2006.01)

(52) U.S. Cl. ........ 454/139; 454/141; 454/143; 454/145; 454/156; 454/157; 454/158

(58) Field of Classification Search .................. 454/139, 454/157, 141, 156, 143, 159, 158, 69; 156/157
See application file for complete search history.

(56) References Cited

U.S. PATENT DOCUMENTS

| | | | | | |
|---|---|---|---|---|---|
| 3,870,495 | A | * | 3/1975 | Dixson et al. | 55/489 |
| 5,050,487 | A | * | 9/1991 | Arold et al. | 454/158 |
| 5,603,476 | A | * | 2/1997 | Merk et al. | 248/309.1 |
| 6,003,169 | A | * | 12/1999 | Davis, Jr. | 4/613 |
| 6,428,409 | B1 | * | 8/2002 | Egami et al. | 454/139 |
| 6,709,480 | B2 | * | 3/2004 | Sundet et al. | 55/499 |

FOREIGN PATENT DOCUMENTS

| | | |
|---|---|---|
| DE | 10356809 B3 | 12/2005 |
| JP | 57-76120 | 5/1982 |
| JP | 2003011640 A * | 1/2003 |
| JP | 2004-189059 | 7/2004 |
| JP | 2004189059 A * | 7/2004 |
| KR | 10-2006-01199164 A | 11/2006 |

* cited by examiner

*Primary Examiner* — Steven B McAllister
*Assistant Examiner* — Brittany E Towns
(74) *Attorney, Agent, or Firm* — Fulbright & Jaworski L.L.P.

(57) ABSTRACT

The present invention relates to a blower for a vehicle, which has an auxiliary door formed on the upper end portion of a filter cover to open and close an indoor air inlet, thereby improving a heating performance by allowing some of the indoor air to flow therein in an outdoor air inflow mode regardless of a type of an indoor and outdoor air switching door, improving productivity and reducing manufacturing costs.

11 Claims, 13 Drawing Sheets

Prior Art

Prior Art

Prior Art

Prior Art

BLOWER FOR VEHICLE

This application claims priority from Korean Patent Application No. 10-2006-0032836 filed Apr. 11, 2006, Korean Patent Application No. 10-2006-0088036 filed Sep. 12, 2006 and Korean Patent Application No. 10-2007-0003673 filed Jan. 12, 2007, each of which is incorporated herein by reference in its entireties.

BACKGROUND OF THE INVENTION

1. Field of the Invention

The present invention relates to a blower for a vehicle, and more particularly, to a blower for a vehicle, which has an auxiliary door formed on the upper end portion of a filter cover to open and close an indoor air inlet, thereby improving a heating performance by allowing some of the indoor air to flow therein in an outdoor air inflow mode regardless of the type (a plate type, a dome type, or others) of an indoor and outdoor air switching door as well as improving productivity and reducing manufacturing costs since an installation and a configuration are simple.

2. Background Art

In general, an air conditioner for a vehicle is designed to introduce indoor/outdoor air of the vehicle thereto and heat or cool it so that the heated or cooled air is blown into the interior of the vehicle, thereby to heat or cool the interior of the vehicle.

As shown in FIG. 1, the air conditioner includes: a blower 10 having an indoor air inlet 21 and an outdoor air inlet 22 formed at a side thereof, an indoor and outdoor air switching door 23 for selectively opening and closing the indoor air inlet 21 and the outdoor air inlet 22, and a blower fan 35 for forcedly blowing the indoor air and the outdoor air toward an inlet 43 of an air-conditioning case 40; and the air-conditioning case 40 having the inlet 43 for introducing the air blown from the blower 10 and an outlet 44 for discharging the air, the air-conditioning case 40 in which an evaporator 41 and a heater core 42 are mounted in order in such manner as to be spaced apart from each other by a predetermined interval.

Here, the indoor and outdoor air switching door 23 adopts one of various types, for instance, a plate type, a dome type to which pressure of the air is applied a little, a cylindrical type, a hemispherical type, and so on according to the use purpose.

FIG. 2 is a sectional view showing a general blower for a vehicle to which the plate-type indoor and outdoor air switching door is applied. As shown in FIG. 2, the blower 10 includes: an intake duct 20 having an indoor air inlet 21 and an outdoor air inlet 22 for respectively introducing the indoor air and the outdoor air and an indoor and outdoor air switching door 23 mounted therein for selectively opening and closing the indoor air inlet 21 and the outdoor air inlet 22; a scroll case 30 coupled to the lower portion of the intake duct 20 and having a blower fan 35 for forcedly blowing the indoor air and the outdoor air to the inside of the air-conditioning case 40; an air filter 25 detachably mounted between the intake duct 20 and the scroll case 30 and having a filter portion 26 and a frame portion 27 for filtering impurities in the introduced air; and a motor 36 mounted below the scroll case 30 to operate the blower fan 35.

In addition, the indoor and outdoor air switching door 23 is actuated by a cable (not shown) and an actuator (not shown), which are mounted separately.

So, the indoor and outdoor air switching door 23 opens the indoor air inlet 21 and closes the outdoor air inlet 22 in an indoor air introducing mode, and in this instance, the indoor air introduced through the indoor air inlet 21 by the actuation of the blower fan 35 passes through a bell mouth 31, moves to the scroll case 30, and then forcedly sent to the inside of the air-conditioning case 40.

Moreover, on the contrary, the indoor and outdoor air switching door 23 closes the indoor air inlet 21 and opens the outdoor air inlet 22 in an outdoor air inflow mode, and in this instance, the outdoor air introduced through the outdoor air inlet 22 by the actuation of the blower fan 35 passes through a bell mouth 31, moves to the scroll case 30, and then forcedly sent to the inside of the air-conditioning case 40.

However, the blower 10 according to the prior art needs a great deal of driving power to enhance a heating performance when a heater is turned on in the winter season or cold days. That is, a driver sets the outdoor air inflow mode to keep a heated state of the vehicle and prevent frost formed on a window in the winter season, and thereby only a cold outdoor air is introduced through the outdoor air inlet 22. So, the blower 10 according to the prior art needs much driving power necessary for heating the inside of the vehicle and deteriorates the heating performance.

To solve the above problems, Japanese Utility Model Laid-Open Publication No. So57-76120 discloses a blower, which has an improved indoor and outdoor air switching door to introduce some of the indoor air in the outdoor air inflow mode, thereby improving a heating performance.

FIG. 3 is a partially sectional view of a blower according to a prior art, and FIG. 4 is a perspective view of an indoor and outdoor air switching door of FIG. 3. The blower includes a plate-type indoor and outdoor air switching door 63 rotatably mounted between an indoor air inlet 61 and an outdoor air inlet 62 for selectively opening and closing the indoor air inlet 61 and the outdoor air inlet 62, the indoor and outdoor air switching door 63 having an auxiliary passageway 71 formed on the upper portion thereof and an auxiliary door 70 formed on a rotary shaft 63a thereof for opening and closing the auxiliary passageway 71 while freely moving on the center of the upper end thereof.

That is, the auxiliary door 70 is usually in a state to close the auxiliary passageway 71 by self-weight, but actuated to open the auxiliary passageway 71 by a negative pressure (pressure difference) generated by an actuation of the blower fan (now shown) in the outdoor air inflow mode. Therefore, when the heater is turned on, the outdoor air introduced through the outdoor air inlet 62 and the indoor air introduced through the auxiliary passageway 71 are mixed and introduced to the inside of the air-conditioning case to thereby reduce driving power necessary for heating and improve the heating performance.

However, since the upper end portion of the indoor and outdoor air switching door 63 is fixed to the rotary shaft 63a using separate fixing screws 64 after the auxiliary door 70 is assembled to the rotary shaft 63a of the indoor and outdoor air switching door 63 in a flap form to individually rotate the indoor and outdoor air switching door 63 and the auxiliary door 70, the blower according to the prior art has several problems in that the number of components is increased unnecessarily, assembling work is complicated, and productivity is lowered due to a rise of manufacturing costs.

In addition, as described above, since the indoor air introducing structure using the auxiliary door 70 in the outdoor air inflow mode can be applied only to the plate-type indoor and outdoor air switching door 63 but cannot be applied to the dome-type or other type (cylindrical type, hemispherical type) indoor and outdoor air switching door, the indoor air cannot be introduced in the outdoor air inflow mode, and thereby, the heating performance is deteriorated.

SUMMARY OF THE INVENTION

Accordingly, the present invention has been made to solve the above-mentioned problems occurring in the prior arts, and it is an object of the present invention to provide a blower for a vehicle, which includes an indoor air inflow opening formed on the upper end portion of a filter cover in such a manner as to be vertically overlapped with an air filter within a predetermined range, an auxiliary door formed on the upper end portion of the filter cover for opening and closing the indoor air inflow opening, and an extension portion formed on the inner surface of the filter cover, thereby improving a heating performance by introducing some of the indoor air in an outdoor air inflow mode regardless of the type of an indoor and outdoor air switching door (a plate type, a dome type, or others) and improving productivity, reducing manufacturing costs and making its size compact due to its simple installation and configuration.

It is another object of the present invention to provide a blower for a vehicle, which has a drain hole formed on the extension portion to discharge water smoothly without stagnation when water is introduced toward the extension portion through the outdoor air inlet, thereby preventing occurrence of a bad smell.

It is a further object of the present invention to provide a blower for a vehicle, which a filter portion is mounted in such a manner that surfaces connecting crest portions and valley portions of the filter portion with each other are arranged in a parallel direction to an introduction direction of the indoor air to prevent a gap from being formed between the filter portion and a frame portion by the indoor air introduced through the indoor air inflow opening, thereby preventing a whistle-like noise and improving a performance.

To accomplish the above object, according to the present invention, there is provided a blower for a vehicle comprising: an intake duct having an indoor and outdoor air switching door mounted therein to open and close an indoor air inlet and an outdoor air inlet; a scroll case coupled to the lower portion of the intake duct and having a blower fan for forcedly blowing the indoor air and the outdoor air introduced to the inside of the intake duct toward an air-conditioning case; an air filter inserted into a receiving chamber disposed between the intake duct and the scroll case and having a filter portion and a frame portion; a filter cover detachably mounted on an entrance of the receiving chamber for sealing the receiving chamber; and an indoor air inflow means mounted on the upstream side of the blower fan for introducing some of the indoor air in an outdoor air inflow mode to thereby improve a heating/cooling performance, wherein the indoor air inflow means includes an indoor air inflow opening formed on the filter cover in such a manner as to be vertically overlapped with the air filter within a predetermined range, an auxiliary door coupled to the upper end of the inner surface of the filter cover via a coupling means to open and close the indoor air inflow opening, and an extension portion formed on the inner surface of the filter cover for allowing the air filter to be spaced apart from the auxiliary door by a predetermined interval.

BRIEF DESCRIPTION OF THE DRAWINGS.

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

In the present invention, description of the same parts and operations as the conventional heat exchanger will be omitted.

Figure 1:
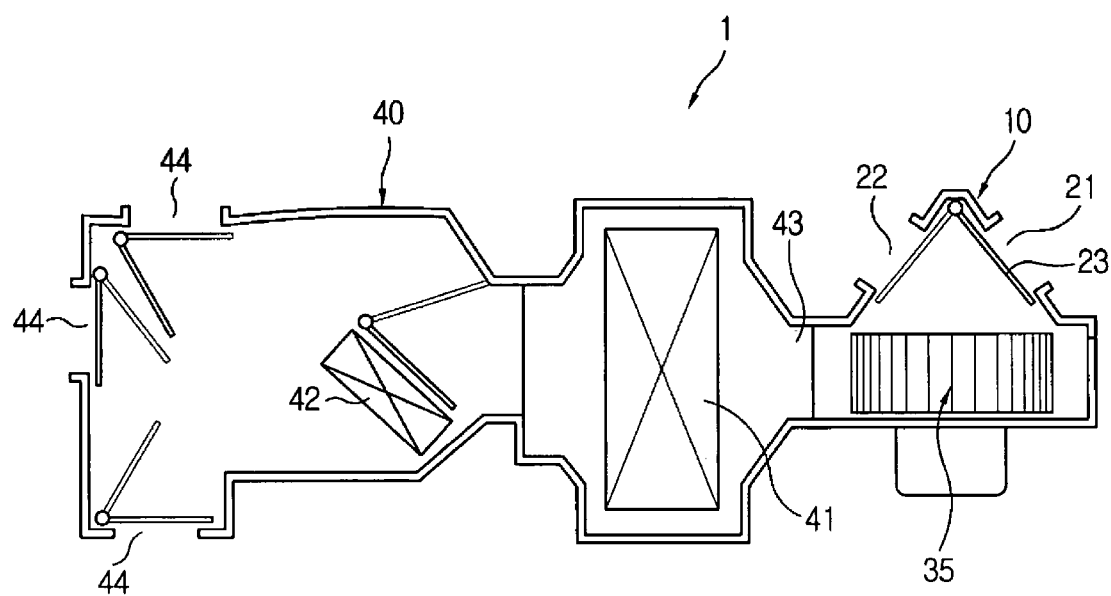
FIG. 1 is a structural view of an air conditioner for a vehicle according to a prior art.
Figure 2:
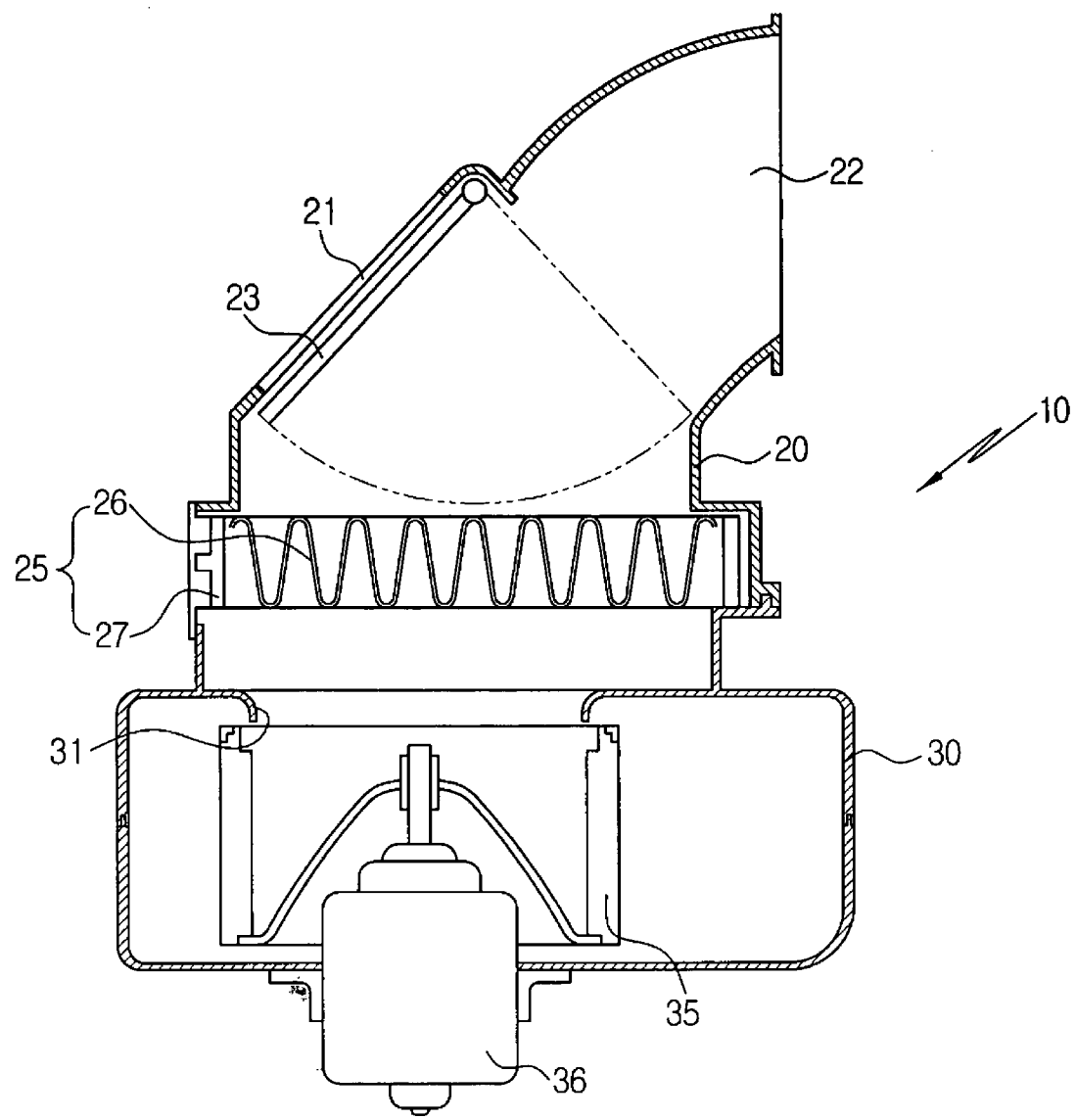
FIG. 2 is a sectional view of a blower for the vehicle according to the prior art.
Figure 3:
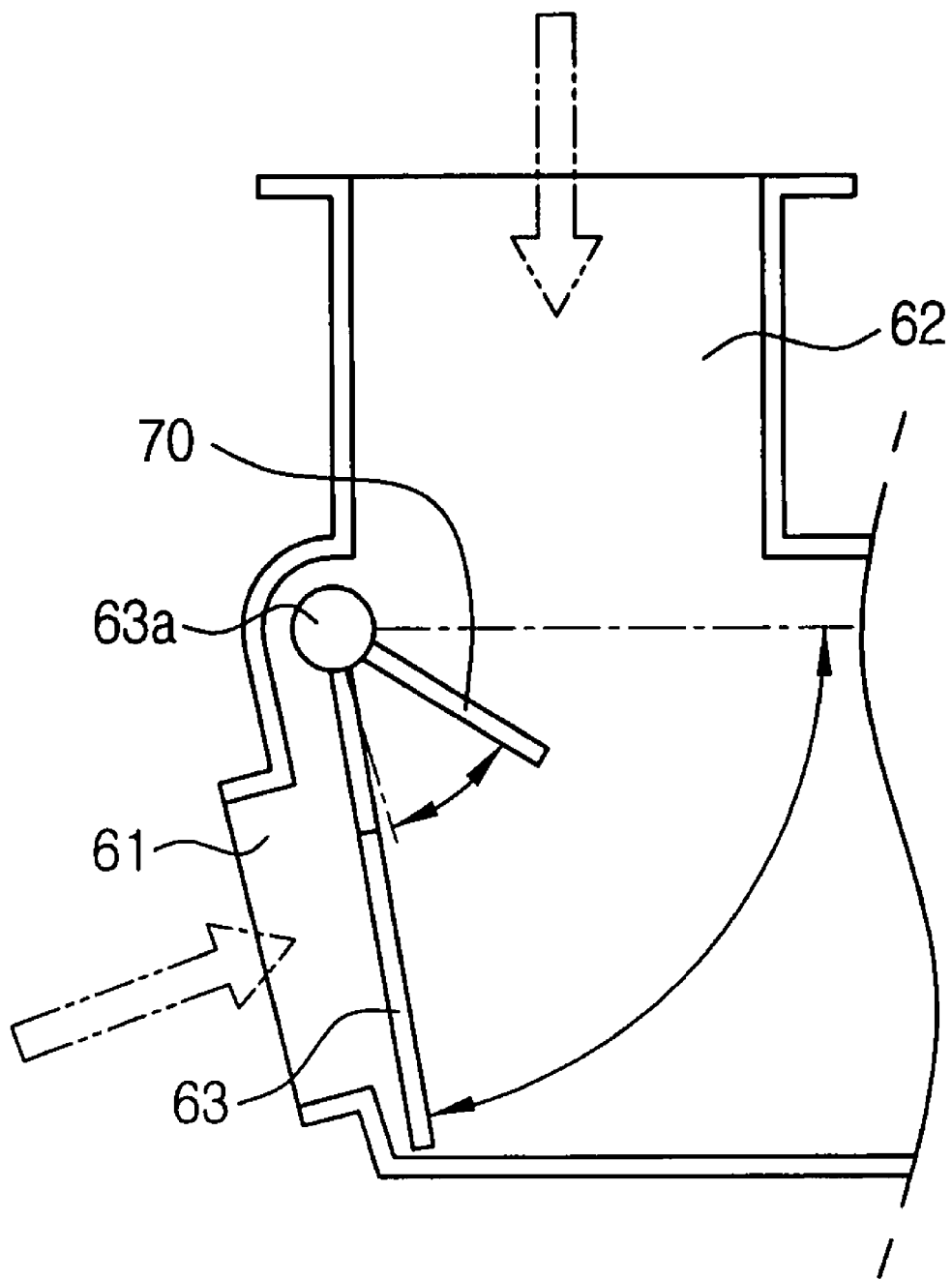
FIG. 3 is a partially sectional view of a blower for a vehicle according to another prior art.
Figure 4:
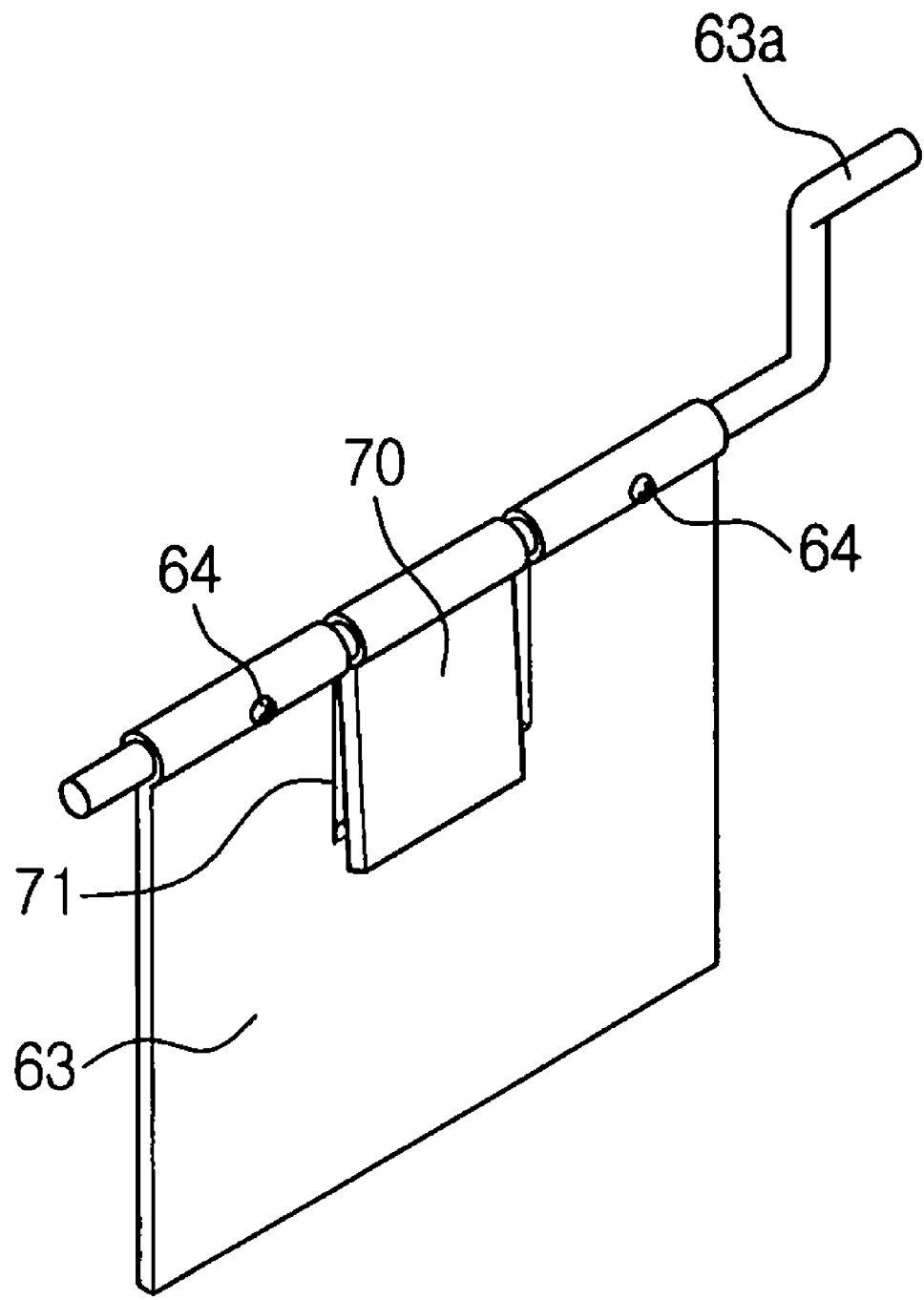
FIG. 4 is a perspective view of an indoor and outdoor air switching door in FIG. 3.
Figure 5:
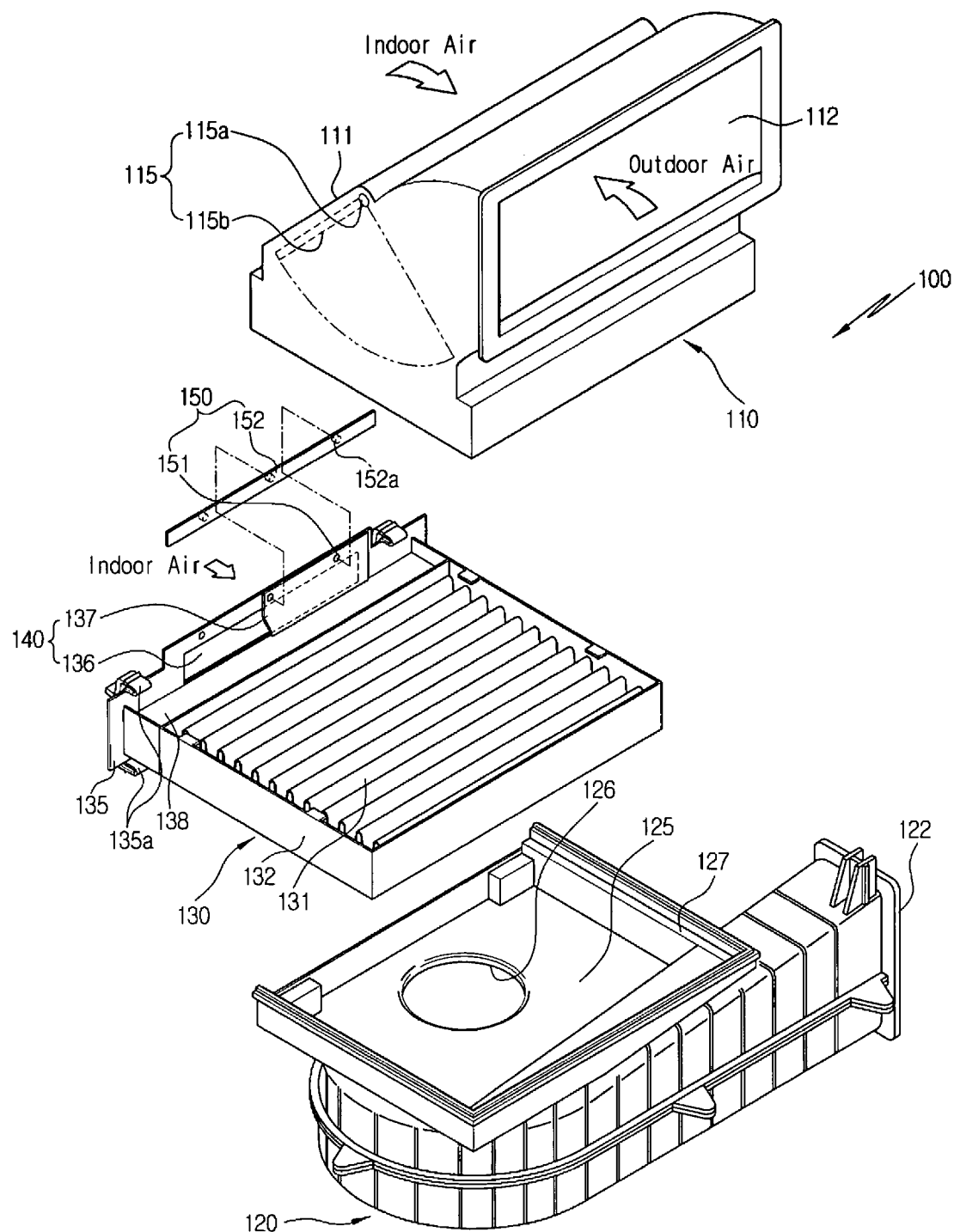
FIG. 5 is an exploded perspective view of a blower for a vehicle according to a first preferred embodiment of the present invention.
Figure 6:
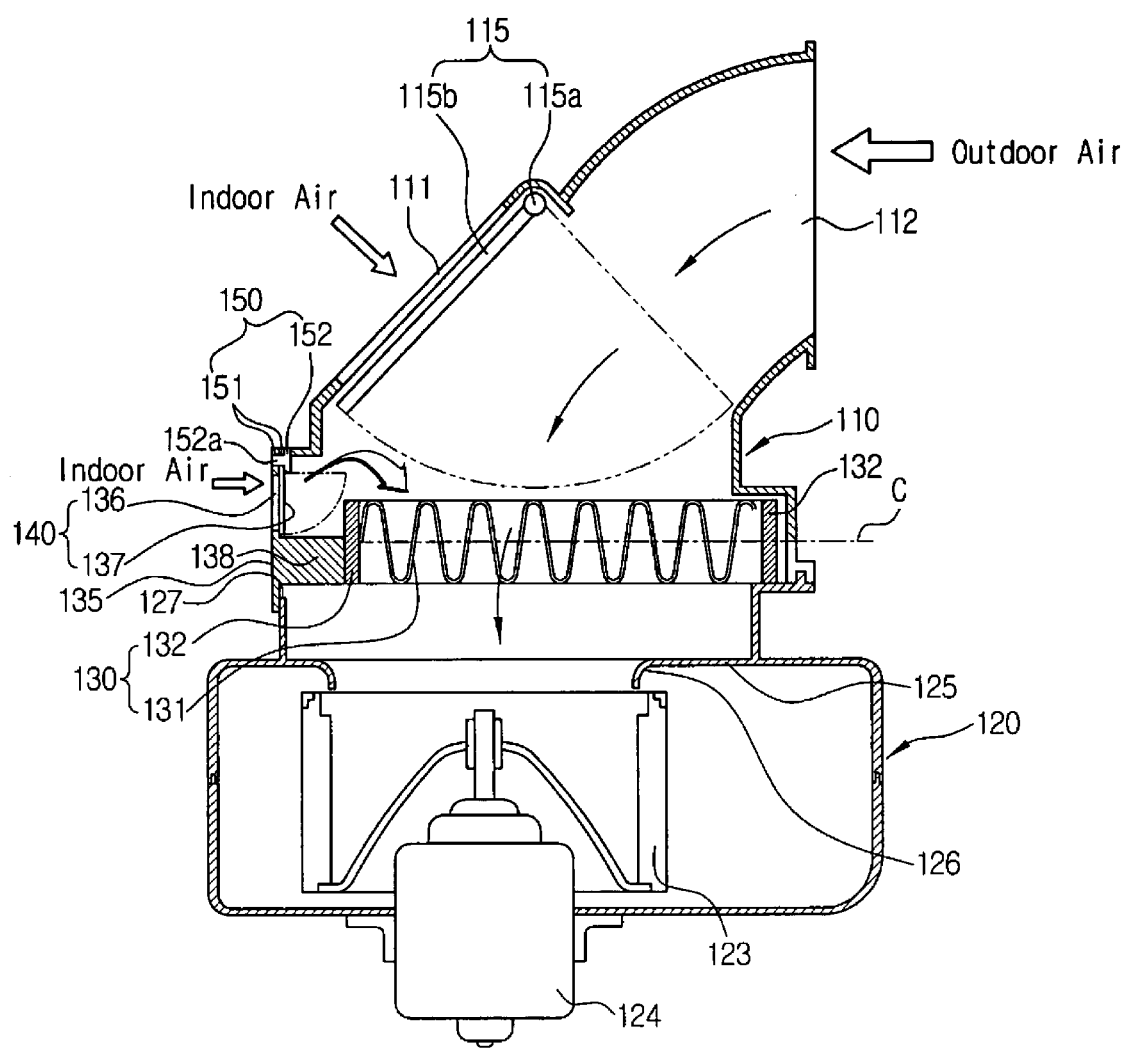
FIG. 6 is a sectional view of the blower for the vehicle according to the first preferred embodiment of the present invention.

FIG. 5 is an exploded perspective view of a blower for a vehicle according to a first preferred embodiment of the present invention, and FIG. 6 is a sectional view of the blower for the vehicle according to the first preferred embodiment of the present invention.

As shown in the drawings, the blower 100 according to the present invention includes: an intake duct 110 having an indoor air inlet 111 and an outdoor air inlet 112 formed on the upper portion thereof; an indoor and outdoor air switching door 115 rotatably mounted inside the intake duct 110 for selectively opening and closing the indoor air inlet 111 and the outdoor air inlet 112; and a scroll case 120 mounted below the intake duct 110 and having a blower fan 123 for forcedly blowing the inside and outdoor air introduced into the intake duct 110 toward an inlet side 43 of an air-conditioning case 40.

The indoor and outdoor air switching door 115 is actuated by a cable (not shown) or an actuator (not shown) separately mounted on the blower 100.

Moreover, the scroll case 120 of the blower 100 has an outlet 122 extending from a side thereof to be coupled with the inlet side 43 of the air-conditioning case 40.

Furthermore, between the intake duct 110 and the scroll case 120, formed is an inlet ring 125 having a bell mouth 126 for guiding the inside and outdoor air introduced through the indoor air inlet 111 and the outdoor air inlet 112 to the upper portion of the blower fan 123. In the present invention, the inlet ring 125 is formed integrally with the upper portion of the scroll case 120.

In addition, a motor 124 is mounted below the scroll case 120 for operating the blower fan 123.

Meanwhile, the indoor and outdoor air switching door 115 is constructed in a plate type, and includes: a rotary shaft 115a rotatably coupled to both side walls of the intake duct 110; and a plate 115b formed on a side of the rotary shaft 115a. The indoor and outdoor air switching door 115 is constructed in the plate type in the drawings, but it would be appreciated that the indoor and outdoor air switching door 115 may adopt one from a dome type, a cylindrical type, a hemispherical type and others.

Additionally, a receiving chamber 127 is formed between the intake duct 110 and the scroll case 120, and an air filter 130 is detachably mounted on the receiving chamber 127 to filter impurities in the introduced air.

The air filter 130 is foldable in a zigzag form, and includes a filter portion 131 for filtering the air and a frame portion 132 for surrounding the filter portion 131, which is seated thereon.

Here, referring to FIG. 11, the filter portion 131 will be described in detail. The filter portion 131 includes: a filter media 131a folded in the zigzag form and having crest portions 131b and valley portions 131c formed repeatedly; and a reinforcing member 131e attached on the filter media 131a in such a manner as to surround the filter media 131a to prevent the filter media 131a from getting loosed and hold the shape of the filter media 131a.

A filter cover 135 is detachably mounted on an entrance of the receiving chamber 127 to seal the receiving chamber 127.

Here, the filter cover 135 may be formed separately on the frame portion 132 of the air filter 130 or integrally with the frame portion 132 via an extension portion 138, which will be described later.

Meanwhile, elastic ribs 135a are formed on the upper and lower ends of the filter cover 135 so that the filter cover 135 can be elastically fixed on and detached from the entrance of the receiving chamber 127.

The indoor and outdoor air switching door 115 opens the indoor air inlet 111 and closes the outdoor air inlet 112 in an indoor air introducing mode, and in this instance, the indoor air introduced through the indoor air inlet 111 by an operation of the blower fan 123 moves to the scroll case 120 after passing through the bell mouth 126, and then, is forcedly blown to the inside of the air-conditioning case 40.

In addition, on the contrary, the indoor and outdoor air switching door 115 closes the indoor air inlet 111 and opens the outdoor air inlet 112 in an outdoor air inflow mode, and in this instance, the outdoor air introduced through the outdoor air inlet 112 by the operation of the blower fan 123 moves to the scroll case 120 after passing through the bell mouth 126, and then, is forcedly blown to the inside of the air-conditioning case 40.

An indoor air inflow means 140 is mounted on the upstream side of the blower fan 123 to improve a heating/cooling performance by introducing some of the indoor air in the outdoor air inflow mode.

The indoor air inflow means 140 is formed on the filter cover 135, and includes: an indoor air inflow opening 136 vertically overlapped with the air filter 130 within a predetermined range; an auxiliary door 137 coupled to the upper end of the inner surface of the filter cover 135 via a coupling means 150 for opening and closing the indoor air inflow opening 136; and the extension portion 138 formed on the inner surface of the filter cover 135 for allowing the auxiliary door 137 and the air filter 130 to be spaced apart from each other by a predetermined interval. When the blower fan 123 is rotated, the auxiliary door 137 is opened by a negative pressure generated in the intake duct 110.

That is, in the outdoor air inflow mode, when the blower fan 123 is rotated, the outdoor air is sucked through the outdoor air inlet 112, and in this instance, the negative pressure is generated in the intake duct 110, and thereby, the auxiliary door 137 is inwardly opened by a pressure difference and the indoor air inflow opening 136 is opened simultaneously, so that the indoor air is introduced through the indoor air inflow opening 136.

Here, it is preferable that the auxiliary door 137 is made of an elastic material, for instance, cloth or thin rubber. Therefore, the auxiliary door 137 made of the elastic material can be easily opened when the negative pressure is generated in the intake duct 110 by the rotation of the blower fan 123. When the blower fan 123 is stopped, a positive pressure is generated in the intake duct 110 by pressure of the outdoor air and the auxiliary door 137 made of the elastic material is closed to thereby close the indoor air inflow opening 136.

Furthermore, it is preferable that the indoor air inflow opening 136 and the auxiliary door 137 are mounted over a central line C of the air filter 130. That is, the indoor air inflow opening 136 is formed in such a manner as to be vertically overlapped with the air filter 130 within the predetermined range, and mounted above the central line C of the air filter 130 to introduce the indoor air smoothly and maximize an introduced amount of the indoor air.

Moreover, since the air filter 130 is spaced apart from the indoor air inflow opening 136 and the auxiliary door 137 by the extension portion 138, which spaces the air filter 130 from the auxiliary door 137 at the predetermined interval, there is no interference between the auxiliary door 137 and the air filter 130 during the opening and closing action of the auxiliary door 137, whereby the mounted positions of the indoor air inflow opening 136 and the auxiliary door 137 can be lowered. So, a height of the filter cover 135 can be reduced, and the blower 100 as well as the filter cover 135 can be manufactured in a compact size.

Here, it is preferable that the length of the extension portion 138 is equal to or larger than that of the auxiliary door 137 to prevent the interference to the air filter 130 when the auxiliary door 137 is rotated.

Figure 10:
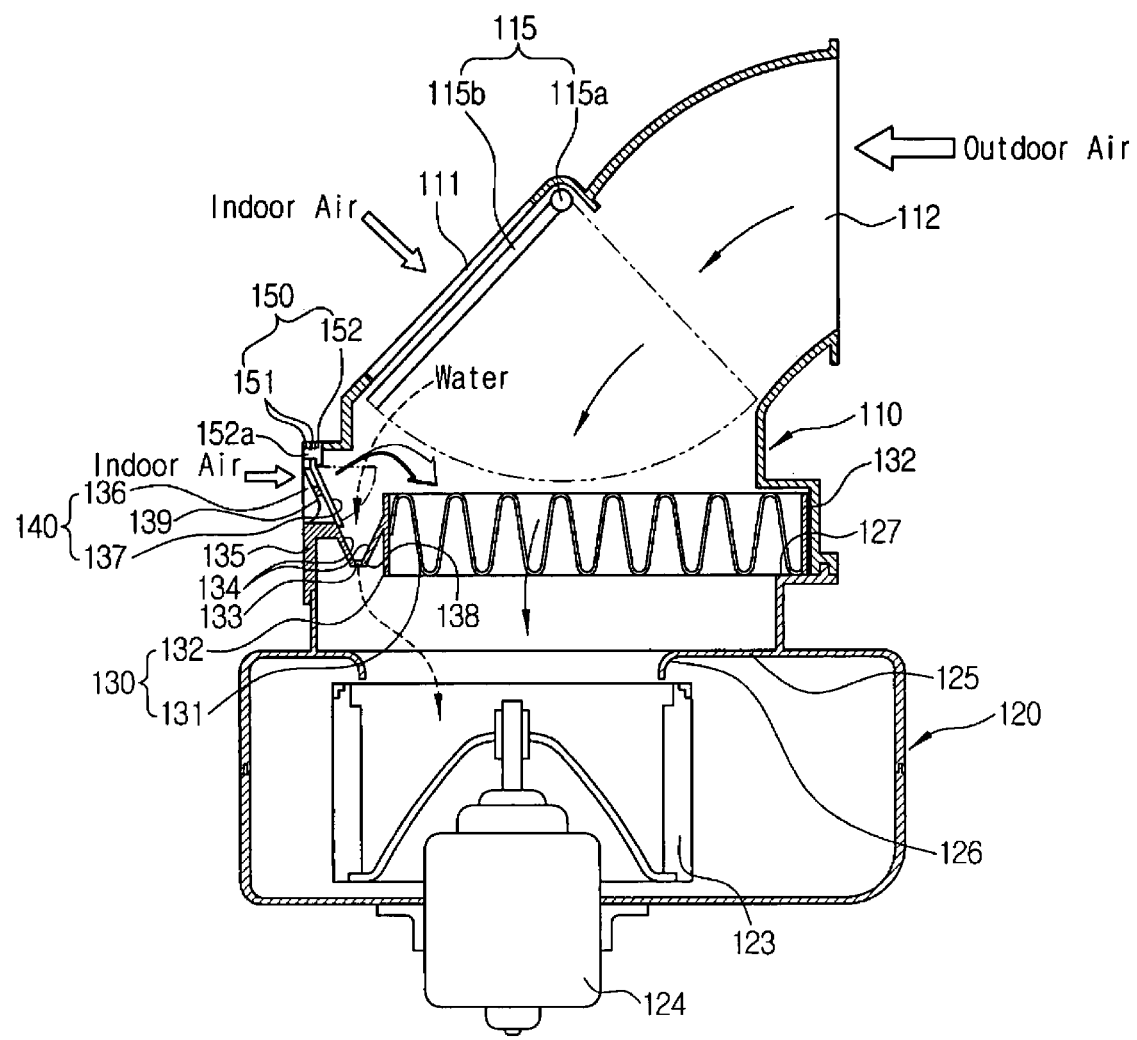
FIG. 10 is a sectional view showing an assembled state of components of FIG. 9.

Meanwhile, as shown in FIG. 10, the extension portion 138 is formed under the central line C of the air filter 130 and may be formed thin.

As described above, the extension portion 138 spaces the air filter 130 from the auxiliary door 137 at the predetermined interval to reduce the height of the filter cover 135, and the filter cover 135 and the air filter 130 are connected with each other, so that the entire indoor air introduced into the indoor air inflow opening 136 moves toward the upper portion of the air filter 130.

In addition, the coupling means 150 for fixing and combining the auxiliary door 137 to the filter cover 135 includes: a plurality of coupling holes 151 formed on the upper ends of the filter cover 135 and the auxiliary door 137; and a fixing member 152 having a plurality of protrusions 152a fit and coupled to the coupling holes 151 to fix the upper end portion of the auxiliary door 137 to the filter cover 135.

Therefore, to easily fix the auxiliary door 137 to the filter cover 135, the protrusions 152a of the fixing member 152 are fit and coupled to the coupling holes 151 of the filter cover 135 and the auxiliary door 137 in a state where the coupling holes 151 of the filter cover 135 and the coupling holes 151 of the auxiliary door 137 are coincided with each other.

As described above, in the blower 100 according to the present invention, the indoor air inflow opening 136 is formed on the upper end portion of the filter cover 135 and the auxiliary door 137 for opening and closing the indoor air inflow opening 136 is fixed and coupled to the upper end of the inner surface of the filter cover 135 via the coupling means 150.

After that, when a driver selects the outdoor air inflow mode by manipulating a blast mode switch of an air-conditioning controller, the indoor and outdoor air switching door 115 is rotated on the rotary shaft 115a toward the indoor air inlet 111 by the operation of the actuator, whereby the indoor air inlet 111 is closed and the outdoor air inlet 112 is opened.

In this instance, the negative pressure is applied to the inside of the intake duct 110 by the rotation of the blower fan 123, and so, there occurs a pressure difference between the inside of the vehicle and the blower 100. The auxiliary door 137 made of the elastic material, which closes the indoor air inflow opening 136, is elastically transformed in an inward direction to thereby open the indoor air inflow opening 136, so that some of the indoor air is introduced into the intake duct 110 through the opened indoor air inflow opening 136.

Therefore, to the inside of the intake duct 110, the outdoor air is introduced through the outdoor air inlet 112 and some of the indoor air is also introduced through the indoor air inflow opening 136. So, when a heater is turned on in the winter season or in the cold weather, the outdoor air of the vehicle which is low in temperature and the indoor air which is relatively high in temperature are introduced into the blower 100 in a mixed state and blown toward the air-conditioning case 40 to thereby improve the heating performance of an air conditioner 1.

In addition, in case of the blowers according to the prior arts, in the outdoor air inflow mode, the structure to introduce some of the indoor air thereto is applied only to the plate-type indoor and outdoor air switching door but cannot be applied to the dome-type or other type (cylindrical type, hemispherical type, or others) indoor and outdoor air switching door. However, since the blower 100 according to the present invention has the indoor air inflow means 140 mounted on the upper end portion of the filter cover 135, which is the upstream side of the blower fan 123, for introducing some of the indoor air in the outdoor air inflow mode, the blower 100 can introduce some of the indoor air thereto in the outdoor air inflow mode regardless of the type (the plate type, the dome type, or others) of the indoor and outdoor air switching door 115 to thereby improve the heating performance.

Figure 7:
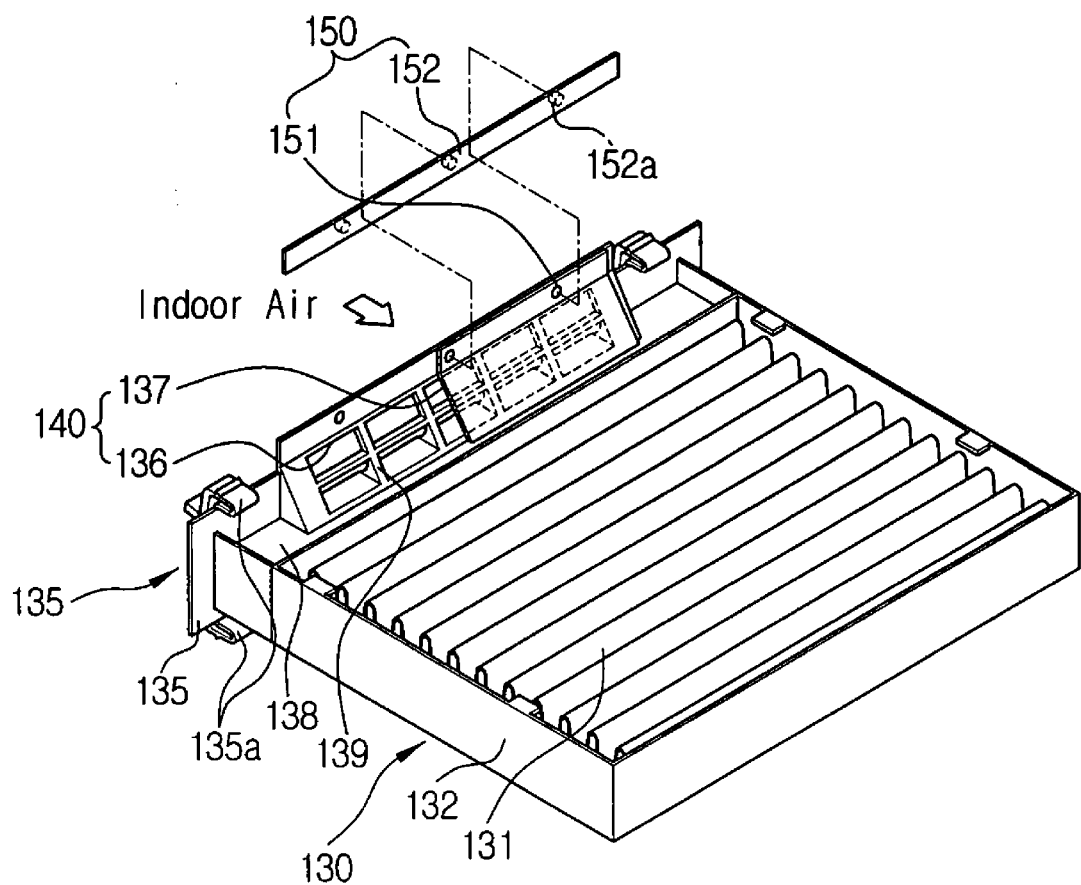
FIG. 7 is a perspective view of an air filter and a filter cover of a blower for a vehicle according to a second preferred embodiment of the present invention.
Figure 8:
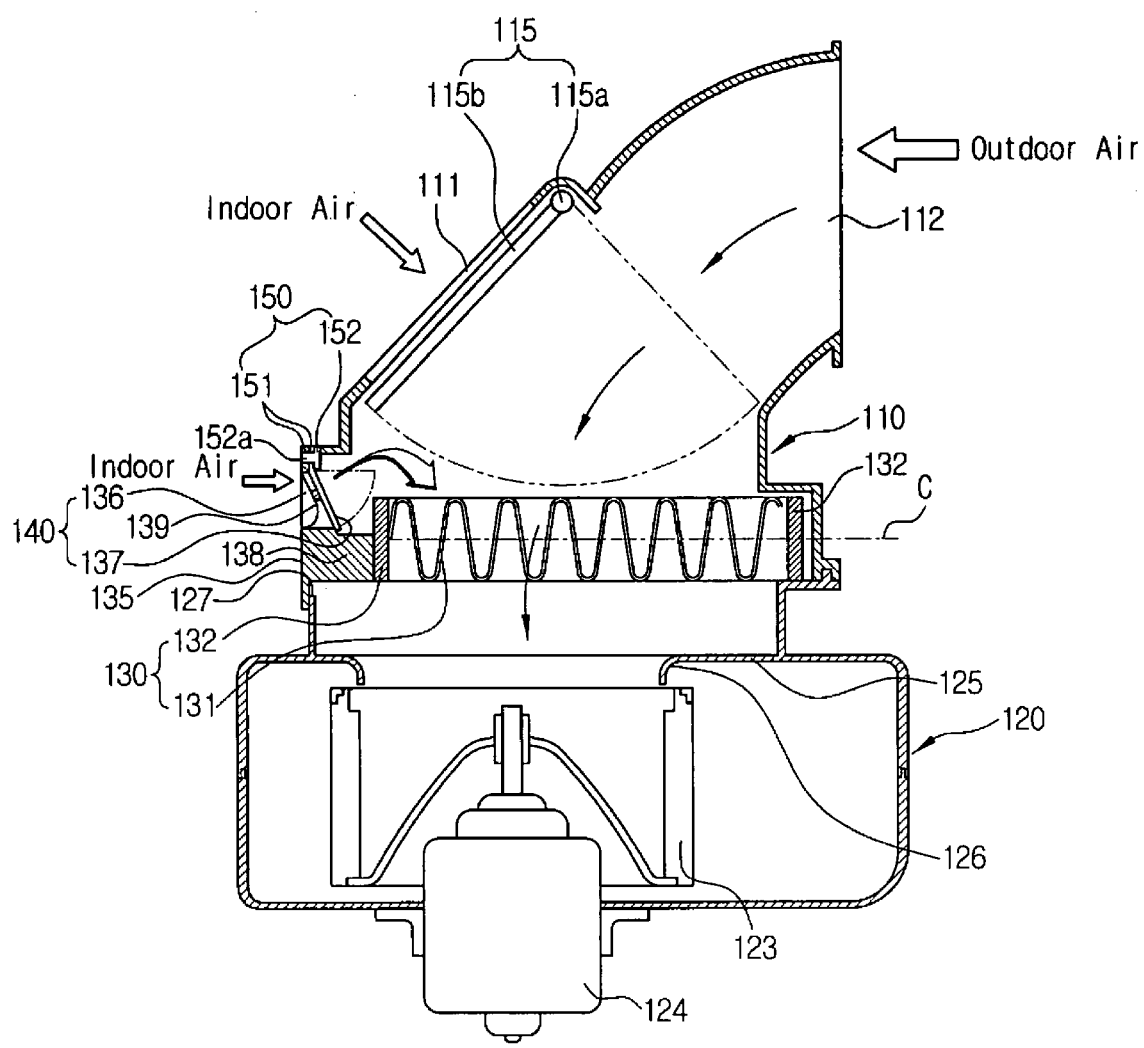
FIG. 8 is a sectional view of the blower in which the air filter and the filter cover of FIG. 7 are coupled with each other.

FIG. 7 is a perspective view of an air filter and a filter cover of a blower for a vehicle according to a second preferred embodiment of the present invention, and FIG. 8 is a sectional view of the blower in which the air filter and the filter cover of FIG. 7 are coupled with each other. As shown in the drawings, the auxiliary door 137 is disposed inclinedly inwardly from the indoor air inflow opening 136. That is, a guide 139 is inclinedly formed on the indoor air inflow opening 136 in the inward direction, and thereby, an initial position of the auxiliary door 137 supported by the guide 139 is inwardly inclined.

As described above, when the auxiliary door 137 is inclinedly formed, an area of the indoor air inflow opening 136 is increased, and so, an introduced amount of the indoor air within a restricted space can be also increased.

Meanwhile, it is preferable that the guide 139 is formed in a net type to allow an introduction of the air.

Figure 9:
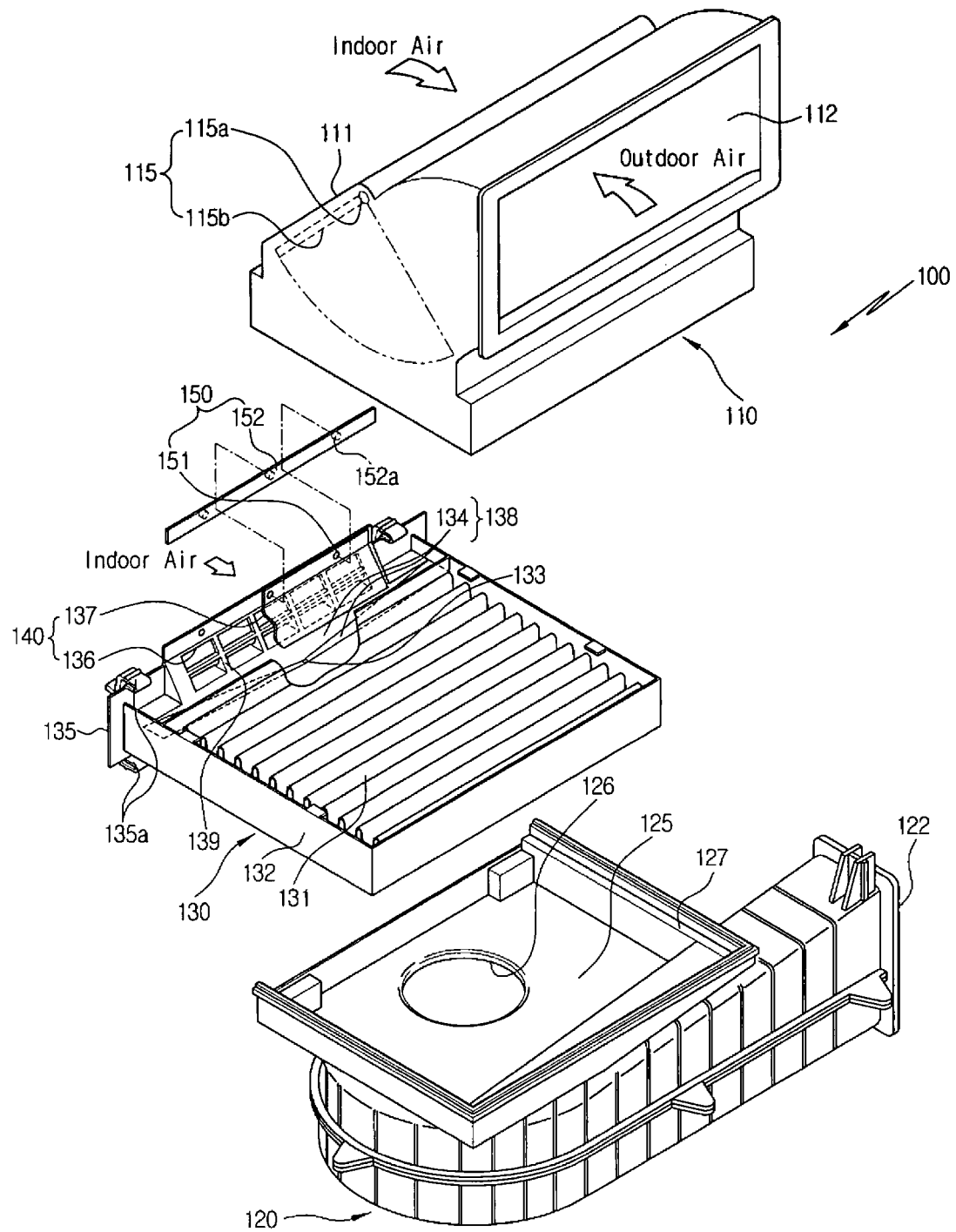
FIG. 9 is an exploded perspective view of a blower for a vehicle according to a third preferred embodiment of the present invention.

FIG. 9 is an exploded perspective view of a blower for a vehicle according to a third preferred embodiment of the present invention, and FIG. 10 is a sectional view showing an assembled state of components of FIG. 9. As shown in the drawings, the extension portion 138 has a drain hole 133 formed thereon to drain water or snow smoothly when water or snow is introduced toward the extension portion 138 formed between the filter cover 135 and the air filter 130 through the outdoor air inlet 112.

That is, when water introduced through the outdoor air inlet 112 drops toward the filter portion 131 of the air filter 130, the water is absorbed to the filter portion 131 or introduced to the bell mouth 126 of the scroll case 120 after passing through the filter portion 131, and then, discharged to the outside through a drain hole (not shown) of the air-conditioning case 40. In this instance, if the water introduced through the outdoor air inlet 112 drops toward the extension portion 138, which is an operational space of the auxiliary door 137, the water is smoothly drained through the drain hole 133 formed on the extension portion 138.

Of course, the water drained through the drain hole 133 is introduced to the bell mouth 126, and then, discharged to the outside through the drain hole (not shown) of the air-conditioning case 40.

In addition, it is preferable that an inclined surface 134 is formed on the extension portion 138 having the drain hole 133 so that water is gathered in the drain hole 133 rapidly and smoothly.

Here, the inclined surface 134 is formed in such a manner that one side thereof formed in an introduction direction of the indoor air introduced through the indoor air inflow opening 136 and the other side formed in a width direction of the extension portion 138 are all downwardly inclined toward the drain hole 133. That is, all faces around the drain hole 133 are downwardly inclined toward the drain hole 133.

Of course, the inclined surface 134 may be formed only on one side face formed in an introduction direction of the indoor air introduced through the indoor air inflow opening 136 and the other side face formed in a width direction of the extension portion 138.

Meanwhile, in the drawings, only one drain hole 133 is illustrated, but a plurality of the drain holes 133 may be formed.

As described above, since the inclined surface 134 and the drain hole 133 are formed on the extension portion 138 formed between the air filter 130 and the filter cover 135, if the water introduced through the outdoor air inlet 112 drops toward the extension portion 138, which is the operational space of the auxiliary door 137, the water is smoothly discharged through the drain hole 133 without stagnation, whereby the blower 100 according to the present invention can prevent a bad smell.

Figure 11:
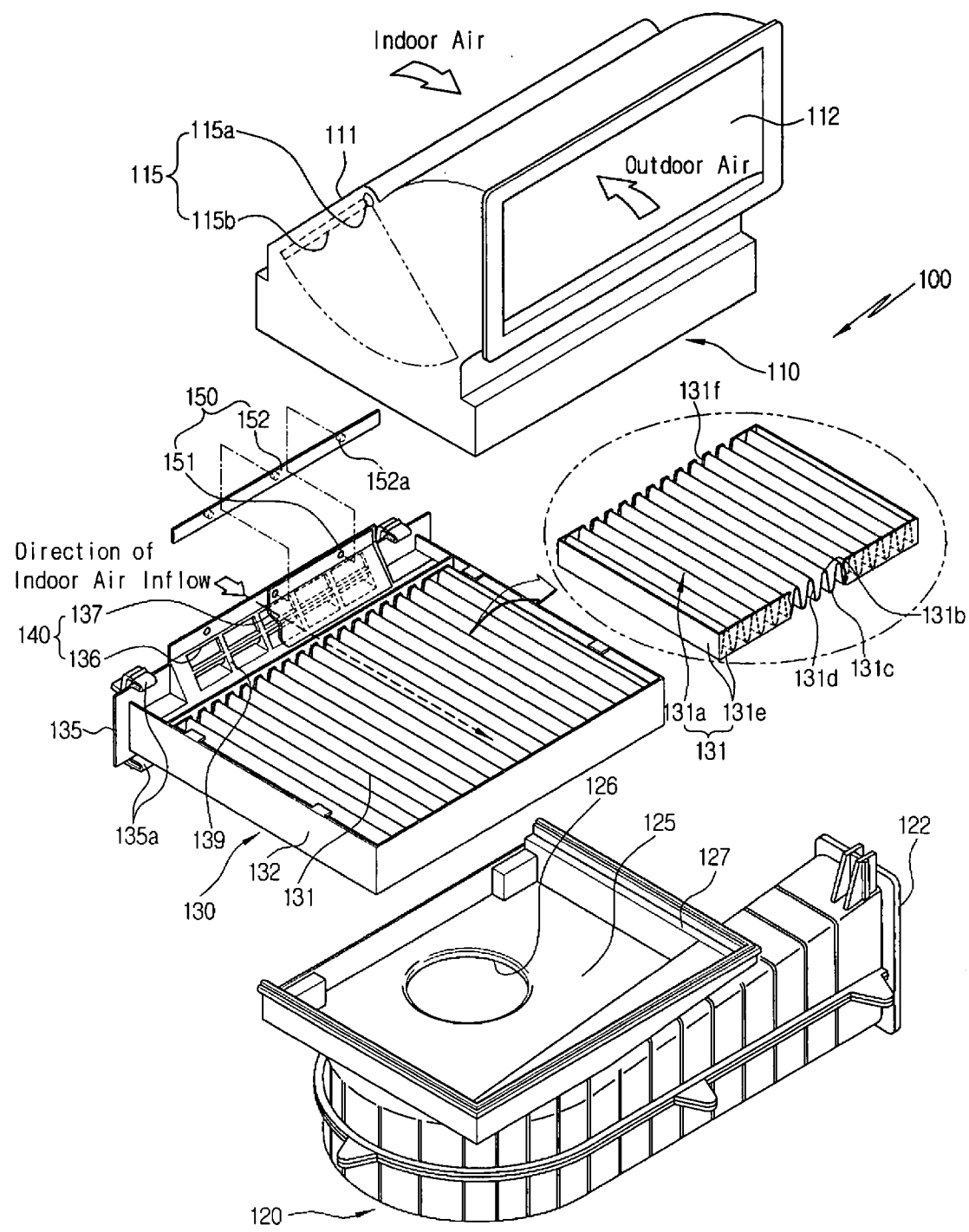
FIG. 11 is an exploded perspective view of a blower for a vehicle according to a fourth preferred embodiment of the present invention.
Figure 12:
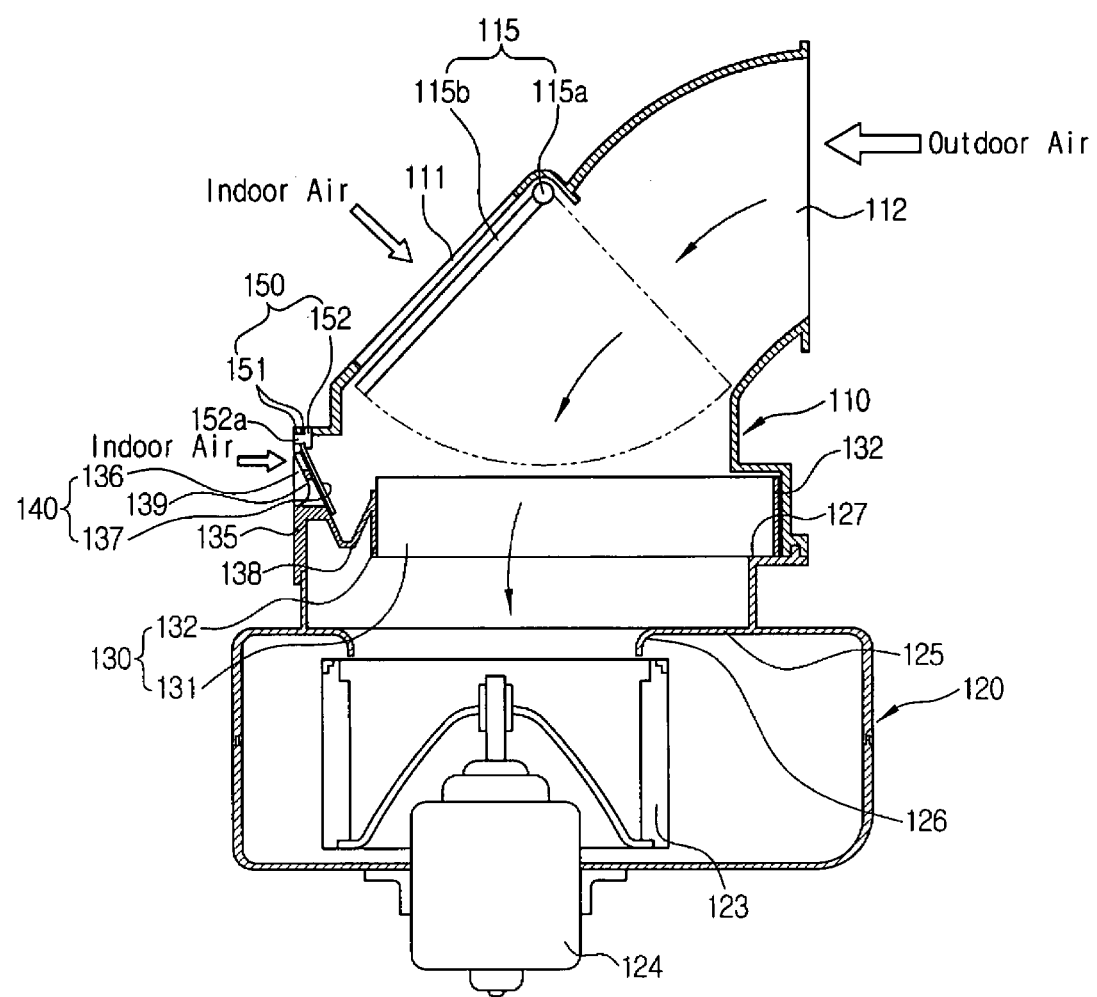
FIG. 12 is a sectional view showing a state where an auxiliary door is closed in an assembled state of FIG. 11.
Figure 13:
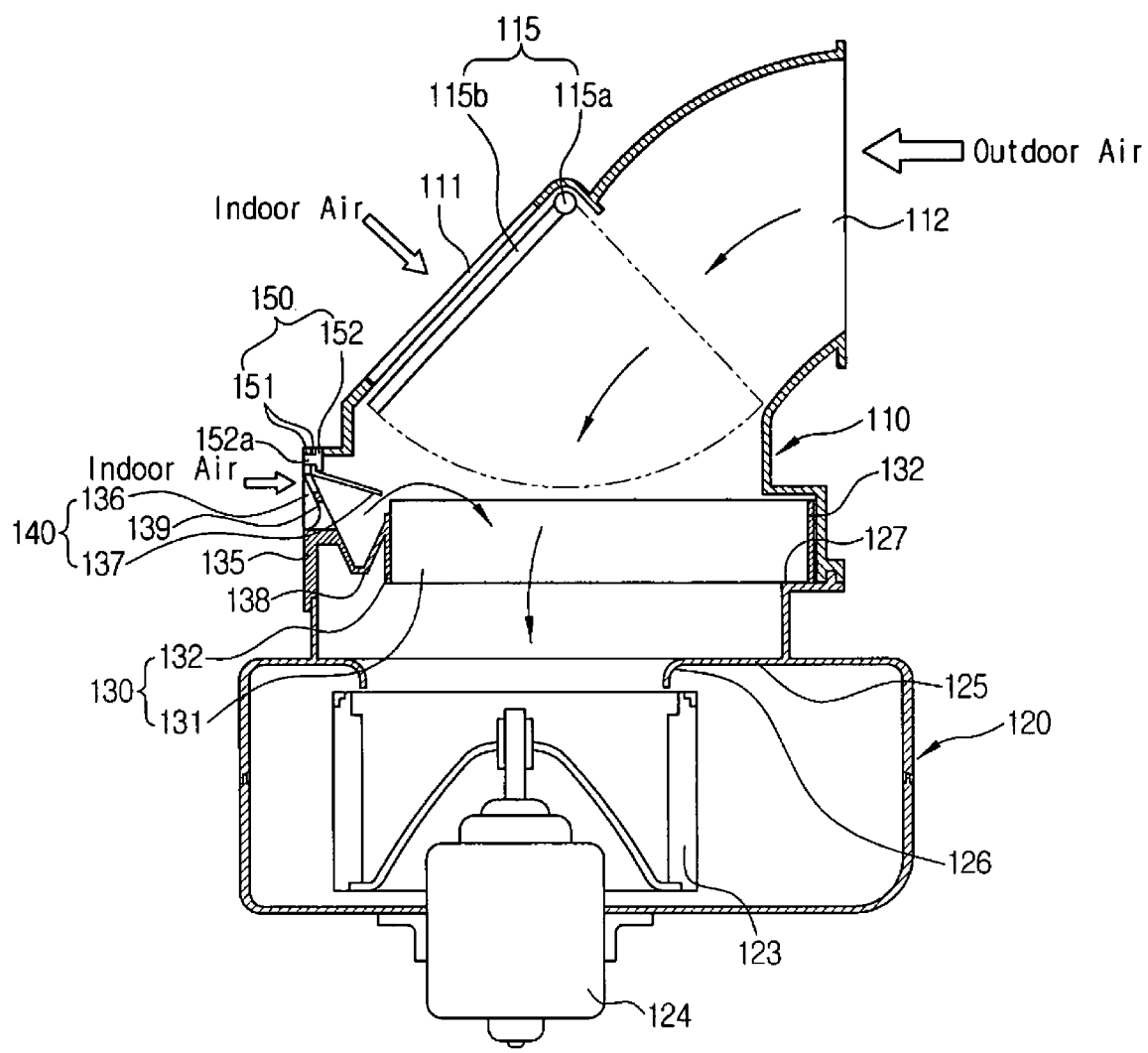
FIG. 13 is a sectional view showing a state where the auxiliary door is opened in an assembled state of FIG. 11.

FIG. 11 is an exploded perspective view of a blower for a vehicle according to a fourth preferred embodiment of the present invention, FIG. 12 is a sectional view showing a state where an auxiliary door is closed in an assembled state of FIG. 11, and FIG. 13 is a sectional view showing a state where the auxiliary door is opened in an assembled state of FIG. 11. As shown in the drawings, to prevent that a portion of the filter portion 131 is pushed (comes off) by the indoor air introduced through the indoor air inflow opening 136, namely, that a gap is formed between the filter portion 131 and the frame portion 132, the filter portion 131 is mounted in such a manner that surfaces 131d connecting the crest portions 131b and the valley portions 131c with each other are arranged in a parallel direction to the introduction direction of the indoor air introduced into the indoor air inflow opening 136.

Therefore, since the surfaces 131d connecting the crest portions 131b and the valley portions 131c with each other are arranged in a parallel direction to the introduction direction of the indoor air introduced into the indoor air inflow opening 136, even though an introduction pressure of the indoor air is applied to the filter portion 131, the blower 100 according to the present invention can prevent the gap from being formed between the filter portion 131 and the frame portion 132, whereby a whistle-like noise can be prevented and the indoor air and the outdoor air can flow through the filter portion 131 smoothly to improve a performance.

Meanwhile, it is preferable that a groove portion 131f is formed on a side of the reinforcing member 131e opposite to the indoor air inflow opening 136 to reduce air resistance when the indoor air is introduced.

Furthermore, as another method to prevent that the gap is formed between the filter portion 131 and the frame portion 132, the filter portion 131 is mounted in a direction shown in FIG. 5, and the reinforcing member 131e for preventing loosening of the filter media 131a and holding the shape of the filter media 131a may be attached on the circumference (four sides) of the filter media 131a. For your reference, the blower according to the prior art has a structure that the reinforcing member is attached only on two faces out of four faces of the filtering paper.

Therefore, even though the filter portion 131 is mounted in the direction shown in FIG. 5, the blower according to the present invention can prevent that the gap is formed between the filter portion 131 and the frame portion 132.

As described above, the present invention has the indoor air inflow opening formed on the upper end portion of the filter cover and the auxiliary door made of the elastic material for opening and closing the indoor air inflow opening, so that the blower can improve the heating performance by introducing some of the indoor air regardless of the type of the indoor and outdoor air switching door (the plate type, the dome type, or others) in the outdoor air inflow mode and improve productivity and reduce manufacturing costs due to the simple installation and configuration.

Furthermore, the present invention can make a smooth introduction of the indoor air and maximize the introduced amount of the indoor air since the indoor air inflow opening and the auxiliary door are mounted in such a manner as to be vertically overlapped with the air filter within the predetermined range and mounted over the central line of the air filter.

Moreover, the present invention can reduce the height of the filter cover and allow a compact size of the blower as well as the filter cover since the extension portion is formed on the inner surface of the filter cover and the air filter is spaced apart from the indoor air inflow opening and the auxiliary door to thereby reduce the mounted height of the indoor air inflow opening and the auxiliary door.

In addition, the present invention can enhance a filtering effect since the entire indoor air introduced into the indoor air inflow opening by the extension portion moves toward the upper portion of the air filter.

Additionally, the present invention can increase the area of the indoor air inflow opening and increase the introduced amount of the indoor air within the restricted space.

Moreover, the present invention can prevent an occurrence of a bad smell since the inclined surface and the drain hole are formed on the extension portion so that water introduced through the outdoor air inlet can be discharged smoothly through the drain hole without stagnation when it drops toward the extension portion.

Furthermore, the present invention can prevent that the gap is formed between the filter portion and the frame portion by the indoor air introduced through the indoor air inflow opening since the filter portion is mounted in such a manner that the surfaces connecting the crest portions and the valley portions of the filter portion with each other are arranged in a parallel direction to the introduction direction of the indoor air introduced through the indoor air inflow opening.

In addition, the present invention can prevent the whistle-like noise and improve its performance by passing the indoor air and the outdoor air through the filter portion smoothly since the gap is prevented from being formed between the filter portion and the frame portion.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A blower for a vehicle comprising:
   an intake duct having an indoor and outdoor air switching door mounted therein to open and close an indoor air inlet and an outdoor air inlet;
   a scroll case coupled to the lower portion of the intake duct and having a blower fan for forcedly blowing the indoor air and the outdoor air introduced to the inside of the intake duct toward an air-conditioning case;
   an air filter inserted into a receiving chamber disposed between the intake duct and the scroll case and having a filter portion and a frame portion;
   a filter cover detachably mounted on an entrance of the receiving chamber for sealing the receiving chamber; and
   an indoor air inflow means mounted on the upstream side of the blower fan for introducing some of the indoor air in an outdoor air inflow mode to thereby improve a heating/cooling performance,
   wherein the indoor air inflow means includes an indoor air inflow opening formed on the filter cover in such a manner as to be vertically overlapped with the air filter in a height direction of the air filter within a predetermined range, an auxiliary door coupled to the upper end of the inner surface of the filter cover via a coupling means to open and close the indoor air inflow opening, and an extension portion extended from the inner surface of the filter cover in such a thickness as to support a part of the lower part of the filter, and allowing the air filter to be spaced apart from the auxiliary door by such an interval as to prevent any interference between the auxiliary door and the air filter during the opening and closing action of the auxiliary door, and thus when the auxiliary door closes the indoor air inflow opening, the lower portion thereof is located to be lower than the upper portion of the air filter, wherein said extension portion is formed on the lower portion of the indoor air inflow opening so as to connect between the inner surface of the filter cover and the frame portion of the air filter and moves the indoor air introduced into the indoor air inflow opening toward the upper portion of the air filter, wherein the extension portion has a drain hole formed on a bottom portion of said extension portion to make the water introduced into the extension portion disposed in parallel on the one side of the air filter bypass the air filter and be introduced into the bell mouth of the scroll case.

2. The blower according to claim 1, wherein the indoor air inflow opening and the auxiliary door are mounted above a central line (C) of the air filter.

3. The blower according to claim 1, wherein the coupling means includes a plurality of coupling holes formed on the upper ends of the filter cover and the auxiliary door, and a fixing member having a plurality of protrusions fit and coupled to the coupling holes for fixing the upper end portion of the auxiliary door to the filter cover.

4. The blower according to claim 1, wherein the length of the extension portion is equal to or larger than that of the auxiliary door.

5. The blower according to claim 1, wherein the auxiliary door is disposed inclinedly inwardly from the indoor air inflow opening by a guide inclinedly formed on the indoor air inflow opening.

6. The blower according to claim 1, wherein the extension portion has an inclined surface formed thereon for allowing water to be gathered in the drain hole.

7. The blower according to claim 6, wherein one side of the inclined surface, which is formed in an introduction direction of the indoor air introduced through the indoor air inflow opening is downwardly inclined toward the drain hole.

8. The blower according to claim 6, wherein the other side of the inclined surface, which is formed in a width direction of the extension portion is downwardly inclined toward the drain hole.

9. The blower according to claim 1, wherein the filter portion is mounted in such a manner that surfaces interconnecting crest portions and valley portions formed by the filter portion folded in a zigzag form are arranged in a parallel direction to the introduction direction of the indoor air introduced into the indoor air inflow opening to thereby prevent a gap from being formed between the filter portion and the frame portion by the indoor air introduced through the indoor air inflow opening.

10. The blower according to claim 9, wherein the filter portion includes a filter media folded in the zigzag form and having the crest portions and the valley portions formed repeatedly, and a reinforcing member for preventing loosening of the filter media and holding the shape of the filter media, wherein the reinforcing member is attached on the circumference of the filter media.

11. The blower according to claim 10, wherein the reinforcing member opposite to the indoor air inflow opening has a groove portion formed at a side thereof to reduce air resistance when the indoor air is introduced.

* * * * *